Patented Nov. 16, 1943

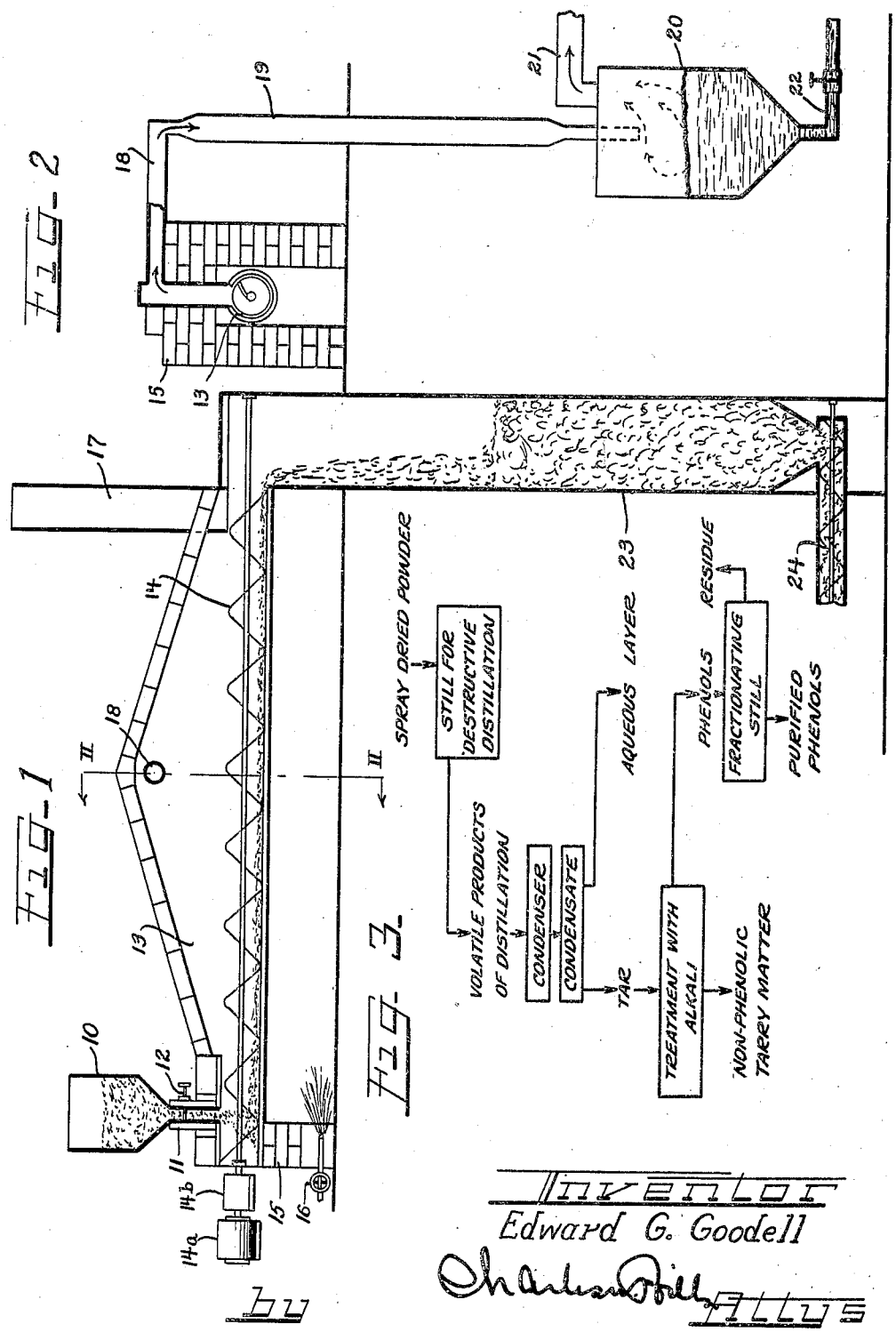

2,334,620

UNITED STATES PATENT OFFICE 2,334,620

METHOD FOR RECOVERING BY-PRODUCTS FROM PULP WASTE LIQUOR RESIDUES

Edward G. Goodell, Stevens Point, Wis.

Application April 10, 1940, Serial No. 328,903

3 Claims. (Cl. 202—3)

This invention relates to a method of recovering by-products from waste liquor residues such as those produced by the spray-drying of the waste liquors produced in the cooking of cellulosic materials.

In the manufacture of chemical pulp, as by the soda, sulfate or sulfite processes, or modifications thereof, waste cooking liquors are produced that contain much of the lignin of the wood or other vegetable material being pulped, as well as spent inorganic materials from the original cooking liquors. It has long been known that the lignin and other organic residues in such waste liquors will yield valuable by-products including methyl alcohol and acetone upon destructive distillation. However, as far as I know, those skilled in the art have not been aware of the fact that phenolic compositions may also be isolated from the products of such destructive distillation. The art has further not known any practical method of obtaining by-products from waste liquors by destructive distillation owing to difficulties encountered in the handling of the waste liquors at high concentration. The waste liquors are then so extremely viscous and sticky that they cannot be caused to flow readily. Furthermore, if batch distillation is resorted to, the liquors foam so badly as to make such distillation practically impossible.

I have now found, however, that the spray dried powder produced from waste cooking liquors by the processes of my Patents Nos. 1,779,535, 1,779,536, 1,779,537 and 1,779,768, all issued on October 28, 1930, or by any other suitable drying method, is peculiarly adaptable to the recovery of by-products without the difficulties heretofore encountered. As the starting material for carrying out the method of my present invention, therefore, I employ a pre-dried material, preferably in the form of spray dried powder, comprising the organic and inorganic solids content of the spent cooking liquor, or other waste liquor having a substantial lignin content. When obtained by the spray drying process described and claimed in my above enumerated patents, both the organic and inorganic constitutents of the spray dried powder are present in a state substantially unchanged chemically from the state in which such constituents exist in the spent cooking liquors. Practically none of the volatile organic constituents are driven off during the spray drying operation. For that reason, the spray dried solids obtained by my patented processes, in addition to being easier to handle, are a richer source of the by-products that this process is designed to recover than would be the so-called "black ash" produced by the usual incinerating processes from waste pulp liquors.

It is therefore an important object of this invention to provide an improved method for the recovery of by-products from the residues from waste liquors such as are produced in the chemical processes for the pulping of wood and other vegetable substances.

Other and further important objects of this invention will be apparent from the disclosures in the specification and the accompanying drawing.

This invention (in a preferred form) is illustrated in the drawing and hereinafter more fully described.

On the drawing:

The drawing illustrates schematically a type of apparatus suitable for carrying out my process. Figure 1 is a diagrammatical longitudinal view of the apparatus. Figure 2 is a diagrammatic view taken along the line II—II of Figure 1. Figure 3 is a flow sheet depicting the process of the present invention.

The starting material for my process is a pre-dried material containing a substantial proportion of lignin, resins and their derivatives. Such material can be obtained, as previously stated, by spray drying waste cooking liquors such as are produced in the cooking of wood and other vegetable material by the usual chemical processes, such as the sulfate, soda, sulfite or other processes employed in the separation of cellulose fibers from the natural wood or vegetable source. While I prefer to start with a spray dried lignin containing material, owing to the ease with which it may be handled and its high content of substantially unchanged organic materials, other methods such as drum drying or film drying may be employed in the preparation of the starting material. Also, while the starting material is here referred to as "pre-dried," it may nevertheless contain an appreciable percentage of water, say upwards of 10% or 15%, so long as it may be handled as a dry solid rather than as a liquid.

As best shown in Figure 1, the pre-dried starting material, preferably in the form of a loosely powdered or granulated mass, is charged into a hopper 10 having a lower water cooled vertical outlet 11 provided with a valve 12 for admitting the powder into a horizontally disposed retort 13 enclosed in a furnace 15. The hopper 10 is kept sufficiently full of the dry powder to act as a seal against the entrance of air into the retort 13. The latter is preferably provided with a worm conveyor 14 for advancing the powder therethrough which is driven by a motor 14a by means of a variable speed drive 14b allowing wide latitude in the R. P. M. of the conveyor. The furnace 15 is adapted to be heated by means of a burner 16 into which is introduced a fluid fuel, such as oil or gas, the requisite amount of air being introduced in any suitable way to afford complete combustion of the fuel. The heated gaseous combustion products are exhausted from the oven through a stack 17.

Electric heating elements may also be attached to the retort 13, thus eliminating the furnace 15, or the section of said retort housing the conveyor 14 may be encased in a concentric metal container through which superheated steam or other heating media are circulated.

The roof of the retort 13, except for a short section below the hopper 10, is extended vertically and closed at the top to provide a collecting chamber for the vapors which are driven off from the powder by the heat of the furnace. As best shown in Figure 2, an outlet duct 18 leads the vapors from the retort 13 through a condenser 19 to a receiving or separating tank 20. From the tank 20, the non-condensable portion of said vapors is withdrawn through the duct 21 to a gas storage tank (not shown). The condensable portion of said vapors is collected in the lower portion of the receiving tank 20 and withdrawn therefrom through a valved duct 22. The tank 20 is kept partly filled with condensate to form a seal for the retort 13.

During its travel through the retort 13, the powder is substantially completely charred. The vaporizable product of the distillation passes out through the duct 18, and the remaining solid carbonaceous residue, which contains the spent cooking chemicals in dry form, is delivered by the conveyor 14 to a char box 23 (Figure 1). From the latter, the solid carbonaceous residue in substantially powdered form is withdrawn by means such as a conveyor 24, to storage (not shown). The char box 23 is kept about three quarters full to provide a seal for the retort 13.

It will be noted that by the means disclosed the retort 13 is effectively sealed at all the three openings thereinto against the admission of air.

The retort 13 is subjected to a higher temperature immediately below the hopper 10 than elsewhere, for the purpose of starting the exothermic decomposition of the powder and for the purpose of effecting an immediate charring action which makes the powder relatively friable and non-sticky. This prompt charring of the dry powder prevents the formation of any sticky or gummy substances and thus avoids the most troublesome features heretofore encountered in the destructive distillation of waste liquor residues, in particular, black liquor solids. The worm conveyor 14 is driven at a speed that advances the powder through the retort 13 over an interval of time sufficient to effect this complete charring. Since I have found that the composition of the products of the destructive distillation is affected by the rate of advancement of the powder, I do not fix any definite time limit for the heating of the powder in the retort 13, leaving the same to be predetermined according to the nature of the products desired. The temperature to which the retort 13 is heated is likewise varied in accordance with the composition desired in the products of the distillation. I have successfully used temperatures ranging from 400° to 1800° F. to produce vapors having temperatures varying from 250° to 900° F. Further, I have successfully allowed from 2 to 15 minutes for the advancement of the powder through the retort 13. I prefer to feed the powder into the retort 13 at a rate which will fill the conveyor 14 to a height roughly equal to from one-eighth to one-half of the cross sectional area of the conveyor flights.

The time and intensity of the destructive distillation is obviously also predetermined in accordance with the nature of the cooking liquors whence the waste liquors are obtained.

It will readily be seen that the distilling apparatus disclosed hereinabove is distinguished by great flexibility and ease of control of operations carried out thereby, thus making possible the successful control of the destructive distillation of waste liquor residues, in particular, black liquor solids, for the production of phenolic compositions.

During the passage of the powder through the retort 13, the powder is subjected in the absence of air to temperatures sufficiently high to effect the destructive distillation of the organic content of the powder. As a result of such destructive distillation, various organic compounds of a volatile nature, such as methyl alcohol, acetone or its derivatives, acetic acid, tar and others, together with water, are formed, and the vapors of these compounds are discharged from the retort 13 through the outlet duct 18 into the condenser 19 whence the condensable portions of the vapors are discharged into the receiving tank 20. At the same time, the organic substances that are not decomposed or volatilized, or the residues remaining after destructive distillation, such as charcoal, together with the inorganic solids, are discharged through the separate outlet for solid products formed by the opening into the char box 23.

The condensed portion of the vapors formed during the destructive distillation of the powder and collected in the receiving tank 20 forms two layers, an upper aqueous layer containing methyl alcohol and acetone and a lower tarry layer. The latter tarry layer is separated from the aqueous layer by decantation of the latter or any other suitable means.

The tar thus produced is black in color, has a specific gravity of 1.046 and a boiling range of from 100° to 700° F. The following is a representative ultimate analysis:

| | Percent dry |
|---|---|
| Carbon | 78.37 |
| Hydrogen | 8.31 |
| Nitrogen | 1.63 |
| Oxygen | 11.14 |
| Sulfur | .44 |
| Ash | .11 |
| | 100.00 |

This tar is rich in phenolic compounds. A fraction having a boiling range of from 160° to 330° C. separated by distillation and comprising 63 per cent of the tar distilled contained 90 per cent of phenolic compounds soluble in sodium hydroxide solution.

Phenols may be isolated from the tar either by an initial fractional distillation of the tar followed by an extraction with sodium hydroxide or by a reversed process employing the same steps. Various fractions may be isolated by fractional distillation. Although the phenolic fractions thus isolated have somewhat different characteristics, they are all suitable for the preparation of protective coatings, varnish, and plastic resins, preservatives, and the like. The phenolic and resinous derivatives are particularly distinguished by compatability with wood and lignin.

The charred product may be treated to recover the spent inorganic chemicals contained therein. If the pre-dried solids are derived from a sulfate black liquor, then the sodium sulfate content of the carbonaceous residue must first be reduced to sodium sulfide before the inorganic salts contained in such carbonaceous residue can be regenerated into active cooking liquors. Accordingly, the charcoal is conveyed from the char box 23 by the conveyor 24 to a smelting furnace (not shown) where the usual smelting operation is carried out. Since the solids delivered to the smelting furnace are dry, or substantially so, and contain a relatively larger proportion of combustible carbonaceous material, the reduction of the sulfate to sulfide may be carried out in the smelting furnace without the use of added fuel, except in the starting up of the smelting furnace, and without the addition of further quantities of carbon to effect the desired reducing action. Sodium sulfate, of course, may be added to the smelting furnace in accordance with the usual practice to make up for losses of alkali metal and sulfur in the cooking and recovery system.

Where the pre-dried solids have been derived from the soda process, the solids from the char box 23 may be delivered into a leaching tank (not shown), into which is also introduced a sufficient quantity of weak liquor or water to effect the leaching operation. The soluble inorganic salts are thus dissolved out of the carbonaceous residue by the weak liquor, fortifying the latter. From the leaching tank, the fortified weak liquors are conducted into a dissolver or causticizing tank (not shown), where fresh chemicals are added as required to replace losses to prepare the liquor for normal cooking liquor composition.

The carbon remaining in the leaching tank after the soluble inorganic salts have been leached from the carbonaceous mass delivered thereto from the receiving tank may be utilized in a furnace for its heat value or may be marketed as such after washing and removal of excess moisture.

If the solids are obtained from the conventional sulfite process, the carbonaceous residue from the receiving tank 23 can be marketed as such or burned for its heat value.

While it is believed that lignin furnishes the principal source from which are derived the phenolic compositions obtainable by the processes according to this invention, the operation of my process is not tied up with any particular theory. The important thing is that the solids content of waste liquors from pulping processes containing upwards of 40 to 60 per cent of the original wood or other vegetable material (on a dry basis) are capable of producing by the method of destructive distillation herein described substantial yields of phenolic compositions adapted for the preparation of protective coatings and resins and for other purposes. This yield of phenolic compositions represents a considerable saving over the added cost of the by-product recovery system and its operation.

Under some conditions it has been found desirable to introduce a regulated amount of moisture, either in the form of steam or water vapor, into the retort 13, to increase the yield of by-products. Catalysts such as sodium hydroxide and other caustic materials can also be introduced to increase the yield.

It will, of course, be understood that various details of construction and operation may be varied through a wide range without departing from the principles of this invention, and it is, therefore, not the purpose to limit the patent granted hereon otherwise than necessitated by the scope of the appended claims.

I claim as my invention:

1. The method of continuously recovering phenolic compositions from granular pre-dried whole spent liquor solids obtained from spent pulp cooking liquors, which comprises forcibly conveying said solids in a loosely powdered condition into a destructive distillation zone, quickly heating said solids during such conveying step to a sufficiently high temperature primarily to char the same and thus render the same relatively friable and non-sticky, then conveying the charred solids through said destructive distillation zone while heating the charred solids to a temperature of from 400° to 1800° F. to distill the same destructively while said solids are being conveyed through said destructive distillation zone, removing the vapors evolved during the destructive distillation to a level higher than said destructive distillation zone so that said vapors will have a temperature of from 250° to 900° F., conducting the vapors to a condenser, collecting the resulting condensate, separating a tarry layer therefrom, and subjecting the separated tar to fractional distillation and to a treatment with an alkali whereby phenolic compositions may be isolated.

2. The method of recovering phenolic compositions from spray dried solids obtained from the spray drying of spent pulp cooking liquors, which comprises conveying said spray dried solids in a loosely powdered condition, subjecting said solids while being so conveyed to a sufficiently high temperature to partially char the same and thus convert the same directly into a relatively friable and non-sticky state, then conveying the charred solids through a destructive distillation zone while heating the charred solids to a temperature of from 400° to 1800° F. to distill the same destructively while said solids are being conveyed through said destructive distillation zone, removing the vapors evolved during the destructive distillation to a level higher than said destructive distillation zone so that said vapors will have a temperature of from 250° to 900° F., conducting the vapors to a condenser, collecting the resulting condensate, separating a tarry layer therefrom, and subjecting the separated tar to fractional distillation and to a treatment with an alkali whereby phenolic compositions may be isolated.

3. The method of recovering phenolic compositions from spent cooking liquors in the manufacture of chemical cellulose pulp, which comprises spray drying said spent liquors to obtain solids containing the organic and inorganic values of said spent liquors in a substantially unchanged chemical state, conveying said solids in a loosely powdered condition into a destructive distillation zone, subjecting said solids while being so conveyed to a sufficiently high temperature to partially char the same and thus convert the same directly into a relatively friable and non-sticky state, then conveying the charred solids through said destructive distillation zone while heating the charred solids to a temperature of from 400° to 1800° F. to distill the same destructively while said solids are being conveyed through said destructive distillation zone, removing the vapors evolved during the destructive distillation to a level higher than said destructive distillation zone so that said vapors will have a temperature of from 250° to 900° F., conducting the vapors to a condenser, collecting the resulting condensate, separating a tarry layer therefrom, and subjecting the separated tar to fractional distillation and to a treatment with an alkali whereby phenolic compositions may be isolated.

EDWARD G. GOODELL.